US009691172B2

(12) United States Patent
Jiao et al.

(10) Patent No.: US 9,691,172 B2
(45) Date of Patent: Jun. 27, 2017

(54) FURRY AVATAR ANIMATION

(71) Applicant: Intel Corporation, Santa Clara, CA (US)

(72) Inventors: Shaohui Jiao, Beijing (CN); Xiaofeng Tong, Beijing (CN); Qiang Li, Beijing (CN); Wenlong Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/763,773

(22) PCT Filed: Sep. 24, 2014

(86) PCT No.: PCT/CN2014/087317
§ 371 (c)(1),
(2) Date: Jul. 27, 2015

(87) PCT Pub. No.: WO2016/045016
PCT Pub. Date: Mar. 31, 2016

(65) Prior Publication Data
US 2016/0247308 A1  Aug. 25, 2016

(51) Int. Cl.
G06T 13/40 (2011.01)
G06T 1/20 (2006.01)
G06T 15/00 (2011.01)
G06T 15/50 (2011.01)
G06T 15/80 (2011.01)

(52) U.S. Cl.
CPC ............ G06T 13/40 (2013.01); G06T 1/20 (2013.01); G06T 15/005 (2013.01); G06T 15/503 (2013.01); G06T 15/80 (2013.01)

(58) Field of Classification Search
USPC .................................................. 345/473, 426
See application file for complete search history.

(56) References Cited

U.S. PATENT DOCUMENTS 5,404,426 A    4/1995 Usami et al.
5,764,233 A *  6/1998 Brinsmead .............. G06T 15/00
                                                  345/419
(Continued)

FOREIGN PATENT DOCUMENTS

CN    102339475 A    2/2012
CN    102419868 A    4/2012
CN    103942090 A    7/2014

OTHER PUBLICATIONS

Yang et al. "Interactive Fur Modeling Based on Hierarchical Texture Layers"; Published 2006.*
(Continued)

Primary Examiner — Kimbinh T Nguyen
(74) Attorney, Agent, or Firm — Schwabe, Williamson & Wyatt, P.C.

(57) ABSTRACT

Apparatuses, methods and storage medium associated with animating and rendering an avatar are disclosed herein. In embodiments, the apparatus may comprise an avatar animation engine to receive a plurality of fur shell texture data maps associated with a furry avatar, and drive an avatar model to animate the furry avatar, using the plurality of fur shell texture data maps. The plurality of fur shell texture data maps may be generated through sampling of fur strands across a plurality of horizontal planes. Other embodiments may be described and/or claimed.

25 Claims, 12 Drawing Sheets

(56) References Cited

U.S. PATENT DOCUMENTS

| | | | | |
|---|---|---|---|---|
| 6,559,849 B1* | 5/2003 | Anderson | ............... | G06T 13/20 |
| | | | | 345/474 |
| 6,952,218 B1* | 10/2005 | Bruderlin | ................ | G06T 13/40 |
| | | | | 345/473 |
| 7,230,624 B2* | 6/2007 | Lengyel | ................. | G06T 15/04 |
| | | | | 345/419 |
| 8,698,810 B2* | 4/2014 | Witkin | .................... | G06T 13/40 |
| | | | | 345/473 |
| 8,957,907 B2* | 2/2015 | Bruderlin | ............... | G06T 13/40 |
| | | | | 345/419 |
| 9,098,944 B2* | 8/2015 | Witkin | .................... | G06T 13/40 |
| 9,177,421 B2* | 11/2015 | Yuksel | .................... | G06T 13/40 |
| 9,314,692 B2* | 4/2016 | Konoplev | ............... | A63F 13/55 |
| 2014/0078144 A1* | 3/2014 | Berriman | ............... | A63F 13/10 |
| | | | | 345/426 |

OTHER PUBLICATIONS

Lengyel et al. "Real-Time Fur over Arbitrary Surfaces", published 2001.*

Ukaji et al. "Acquiring Shell Textures from a single Image for Realistic Fur Rendering", Published 2012.*

Jial et al. "Simulation of Weathering Fur". Published 2009.*

International Search Report and Written Opinion mailed Jun. 30, 2015 for International Application No. PCT/CN2014/087317, 17 pages.

* cited by examiner (a) Fur strands  (b) Multi-layer texture (e.g. N-layer)  (c) shell texture upon avatar mesh (a) A patch of fur strands  (b) Fur shell texture. From left to right: 0th, 4th, 9th, 14th layer; from top to bottom: RGB texture, alpha texture (a) Fur length UV map (b) Fur length attributes on avatar mesh

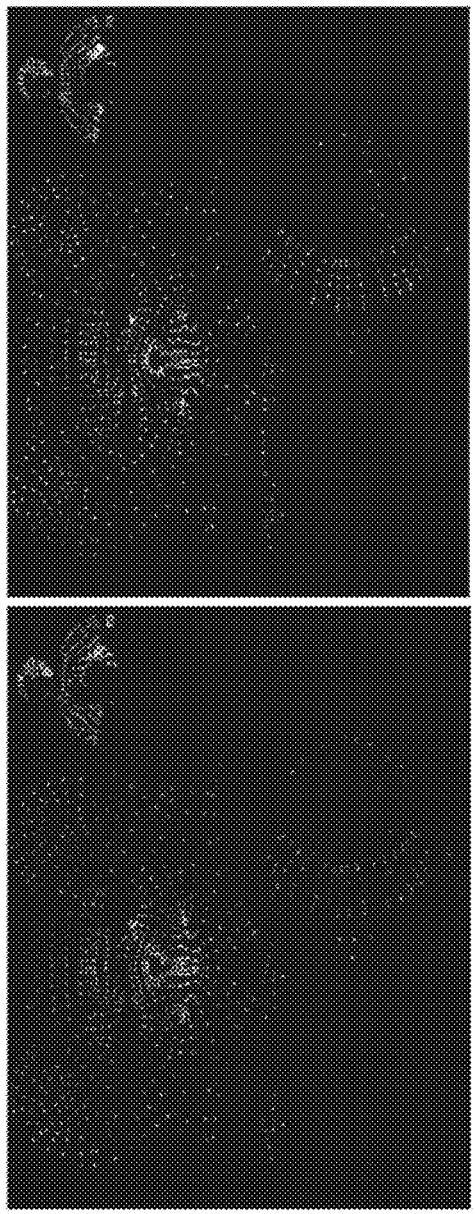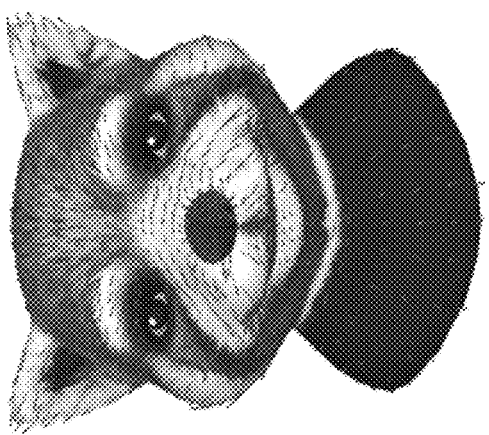
(a) Vector field UV map contains RGB-channel (Left) and A-channel (Right)
(b) Corresponding bending force defined on avatar mesh
Figure 7

Traditional fur representation (Left) and non-even method (Right).

Comparison between without/with fur shell texture.

FURRY AVATAR ANIMATION

CROSS REFERENCE TO RELATED APPLICATIONS

The present application is a national phase entry under 35 U.S.C. §371 of International Application No. PCT/CN2014/087317, filed Sep. 24, 2014, entitled "FURRY AVATAR ANIMATION", which designated, among the various States, the United States of America. The Specification of the PCT/CN2014/087317 Application is hereby fully incorporated by reference.

TECHNICAL FIELD

The present disclosure relates to the field of data processing. More particularly, the present disclosure relates to animation and rendering of furry avatar.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

As user's graphic representation, avatar has been quite popular in virtual world. However, most existing avatar systems are static, and few of them are driven by text, script or voice. Some other avatar systems use graphics interchange format (GIF) animation, which is a set of predefined static avatar image playing in sequence. In recent years, with the advancement of computer vision, camera, image processing, etc., some avatar may be driven by facial expressions. However, existing systems tend to be computation intensive, requiring high-performance general and graphics processors, and do not work well on mobile devices, such as smartphones or computing tablets.

Further, fur technology is an important module in graphics rendering of avatar; it can greatly enhance the visual quality for furry animal avatars, like cat, fox, etc. and improve user experience. Traditionally, fur technology is widely used in PC gaming, however, it has not been used in mobile platform due to its high computational cost.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIGS. 5-7 illustrate example fur shell text data maps, according to the disclosed embodiments.

DETAILED DESCRIPTION

Figure 1:
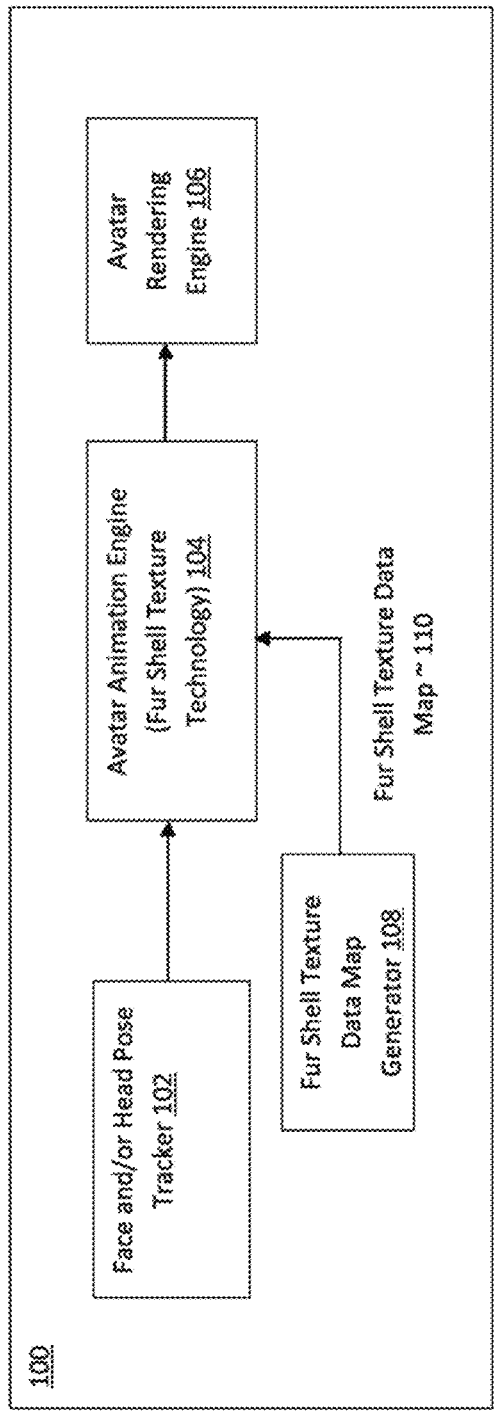
FIG. 1 illustrates a block diagram of a pocket avatar system, according to the disclosed embodiments.

Apparatuses, methods and storage medium associated with animating and rendering an avatar are disclosed herein. In embodiments, the apparatus may comprise an avatar animation engine to receive a plurality of fur shell texture data maps associated with a furry avatar, and drive an avatar model to animate the furry avatar, using the plurality of fur shell texture data maps. The plurality of fur shell texture data maps may be generated through sampling of fur strands across a plurality of horizontal planes. In other embodiments, the avatar animation engine may determine an area of the furry avatar influenced by a force, and deformation of fur strands within the area caused by the force, and adapt the animation to reflect the deformation of the fur strands within the influenced area, based at least in part on a plurality of parameters depicting the force. In still other embodiments, the apparatus may also comprise a fur shell texture data map generator to generate the fur shell texture data maps. In embodiments, the fur shell texture data maps may comprise two dimensional (2D) UV maps, in particular, a fur color 2D UV map, a fur length 2D UV map, and a fur bending direction 2D UV map.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 3:
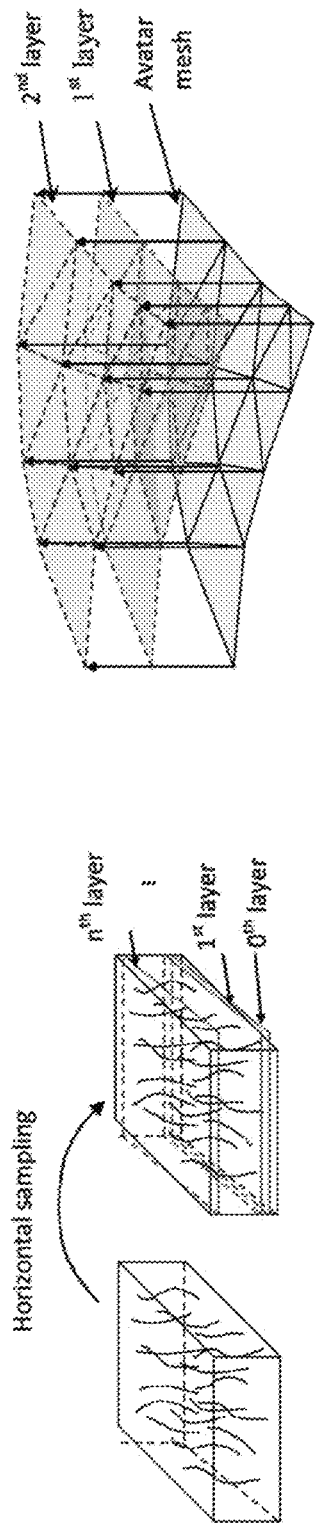
FIGS. 3-4 illustrate the example process for generating fur shell text data maps in further detail, according to the disclosed embodiments.

Referring now to FIG. 1, wherein a pocket avatar system, according to the disclosed embodiments, is shown. As illustrated, pocket avatar system 100 may include face and/or head pose tracker 102, avatar animation engine 104, avatar rendering engine 106, and fur shell texture data map generator 108, coupled with each other as shown. As will be explained further below, avatar animation engine 104 may be incorporated with fur shell texture technology of the present disclosure to provide quality animation and rendering of furry avatar, suitable for portable devices. In particular, avatar animation engine 104 may be configured to employ a number of fur shell texture data maps 110 of a furry avatar to drive an avatar model to animate and render the furry avatar to provide the quality performance animation and rendering. Fur shell texture data map generator 108 may be configured to pre-generate fur shell texture data maps 110 for the furry avatar for avatar animation engine 104. In embodiments, avatar animation engine 104 may pre-generate fur shell texture data maps 110 through multi-layer sampling of the fur strands of the furry avatar, i.e., through sampling of the fur strands across a plurality of horizontal layers (also may be referred to as planes), as depicted in sections (a) and (b) of FIG. 3. The locations of the fur strands on the various layers/planes may then be mapped to the avatar mesh, as depicted in section (c) of FIG. 3. In these embodiments, the multi-layer sampling replaces the traditional approach of using a large number of triangles to represent the hair strands on the avatar surface. In one experiment, the multi-layer sampling approach provides around 1400× speedup over the traditional triangle approach on a Samsung Galaxy S4 platform, while providing comparable or better visual quality. The fur shell texture technology of the present disclosure enables effective manipulation of color, length as well as bending direction of the fur strands providing realistic rendering of furry avatar.

In embodiments, face and/or head pose tracker 102 may be configured to receive a plurality of image frames, e.g., from an image source, such as a camera (not shown), detect facial action movements of a face of a user and/or head pose gestures of a head of the user, within the plurality of image frames, and output a plurality of facial motion parameters that depict facial action movements detected, e.g., eye and/or mouth movements, and head pose gesture parameters that depict head pose gestures detected, such as head rotation, movement, and/or coming closer or farther from the camera, all in real time. Avatar animation engine 104 may be further configured to receive the plurality of facial motion parameters and/or head pose gesture parameters outputted by the face and/or head pose tracker 102, and drive the avatar model to animate the furry avatar to replicate a facial expression of the user on the avatar that optionally factors in head rotation impact. Avatar rendering engine 106 may be configured to draw the avatar as animated by avatar animation engine 104.

In embodiments, face and/or head pose tracker 102 may be any one of a number of face and/or head pose tracker known, including, e.g., the facial mesh tracker disclosed in co-pending patent application, PCT Patent Application No. PCT/CN2014/073695, entitled "FACIAL EXPRESSION AND/OR INTERACTION DRIVEN AVATAR APPARATUS AND METHOD," filed Mar. 19, 2014. As disclosed, the facial mesh tracker of PCT/CN2014/073695 may include various function blocks to track facial expression and head pose of a user. In particular, the facial mesh tracker may include a head pose tracking function block configured to calculate rotation angles of the user's head, including pitch, yaw and/or roll, and translation distance along horizontal, vertical direction, and coming closer or going farther from the camera. The calculation may be based on a subset of sub-sampled pixels of the plurality of image frames, applying dynamic template matching and re-registration. These function blocks may be sufficiently accurate, yet scalable in their processing power required, making pocket avatar system 100 particularly suitable to be hosted by a wide range of mobile computing devices, such as smartphones and/or computing tablets.

In embodiments, avatar animation engine 104, in addition to being configured to employ fur shell texture data maps 110 to provide quality performance furry avatar animation and rendering, may be configured to employ a plurality of pre-defined blend shapes during animations, to speed up its operations. In embodiments where shape blending is employed, a model with neutral expression and some typical expressions, such as mouth open, mouth smile, brow-up, and brow-down, blink, etc., may be first pre-constructed, prior to facial tracking and animation. The blend shapes may be decided or selected for various tracker 102 capabilities and target mobile device system requirements. During operation, face and/or head pose tracker 202 may output the blend shape weights for avatar animation engine 104.

Upon receiving the blend shape weights ($\alpha_i$) for the various blend shapes, avatar animation engine 104 may generate the expressed facial results with the following formula (Eq. 1):

$$B^* = B_0 + \sum_t \alpha_t \cdot \Delta B_i \quad (1)$$

where
B* is the target expressed facial,
$B_0$ is the base model with neutral expression, and
$\Delta B_i$ is $i^{th}$ blend shape that stores the vertex position offset based on base model for specific expression.

Compared with other facial animation techniques, such as motion transferring and mesh deformation, using blend shape for facial animation may have several advantages: 1) Expressions customization: expressions may be customized according to the concept and characteristics of the avatar, when the avatar models are created. The avatar models may be made more funny and attractive to users. 2) Low computation cost: the computation may be configured to be proportional to the model size, and made more suitable for parallel processing. 3) Good scalability: addition of more expressions into the framework may be made easier.

It will be apparent to those skilled in the art that these features, individually and in combination, make pocket avatar system 100 particularly suitable to be hosted by a wide range of mobile computing devices. However, while pocket avatar system 100 is designed to be particularly suitable to be operated on a mobile device, such as a smartphone, a phablet, a computing tablet, a laptop computer, or an e-reader, the disclosure is not to be so limited. It is anticipated that pocket avatar system 100 may also be operated on computing devices with more computing power than the typical mobile devices, such as a desktop computer, a game console, a set-top box, or a computer server. The foregoing and other aspects of pocket avatar system 100 will be described in further detail in turn below.

Figure 2:
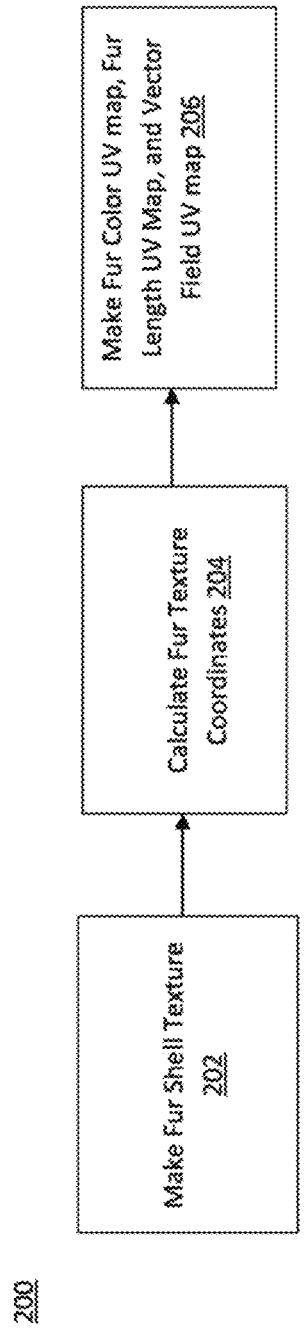
FIG. 2 illustrates an example process for generating fur shell text data maps, according to the disclosed embodiments.

FIG. 2 illustrates an example process for generating fur shell texture data maps, according to the disclosed embodiments. As shown, process 200 for generating fur shell texture data maps may include operations performed in blocks 202-206. The operations may be performed, e.g., by fur shell texture data map generator 108 of FIG. 1.

Figure 4:
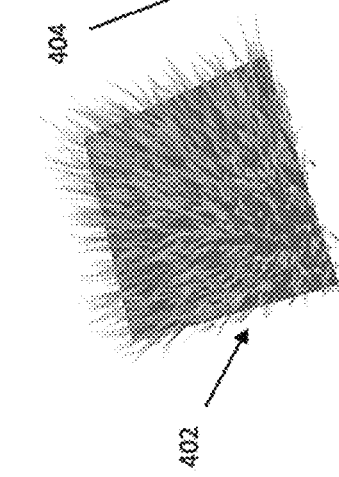

Process 200 may begin at block 202. At block 202, fur shell texture of a furry avatar may be made. In embodiments, a patch of fur strands 402 may be first made, e.g., using a particle system or mesh model, as illustrated in section (a) of FIG. 4. Then, fur patch 402 may be sampled horizontally across a plurality of players/planes to obtain the fur shell textures for the multiple layers/planes 404, as shown in section (b) of FIG. 4, which includes the RGB and alpha textures (going top to bottom) for the $0^{th}$, $4^{th}$, $9^{th}$ and $14^{th}$ sampling layer/plane. (RGB=Red, Green and Blue.)

From block 202, process 200 may proceed to block 204. At block 204, the fur texture coordinates may be calculated. In embodiments, small regions of fur shell texture may be repeatedly pasted onto parts of the avatar mesh that can be easily mapped, until the entire avatar mesh is covered with copies of overlapping fur shell texture. During each paste operation, the fur texture coordinate of mapping fur shell texture to each vertex of the avatar mesh may be calculated and recorded.

Figure 5:
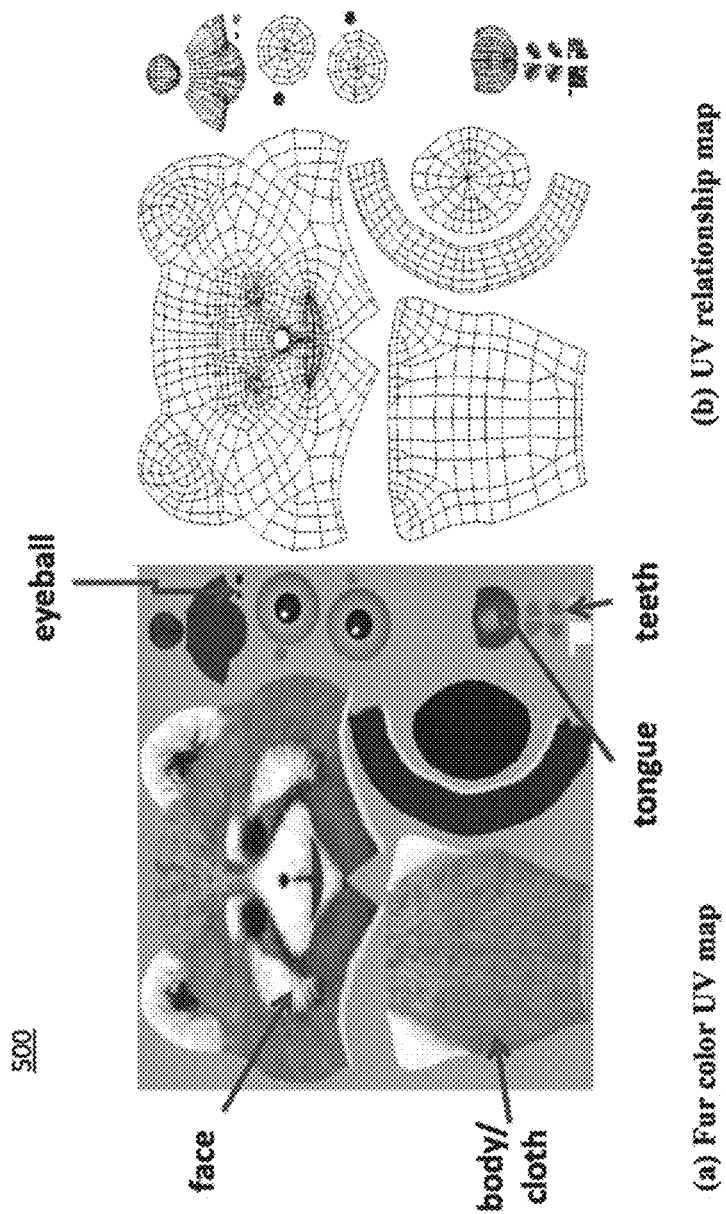
Figure 6:
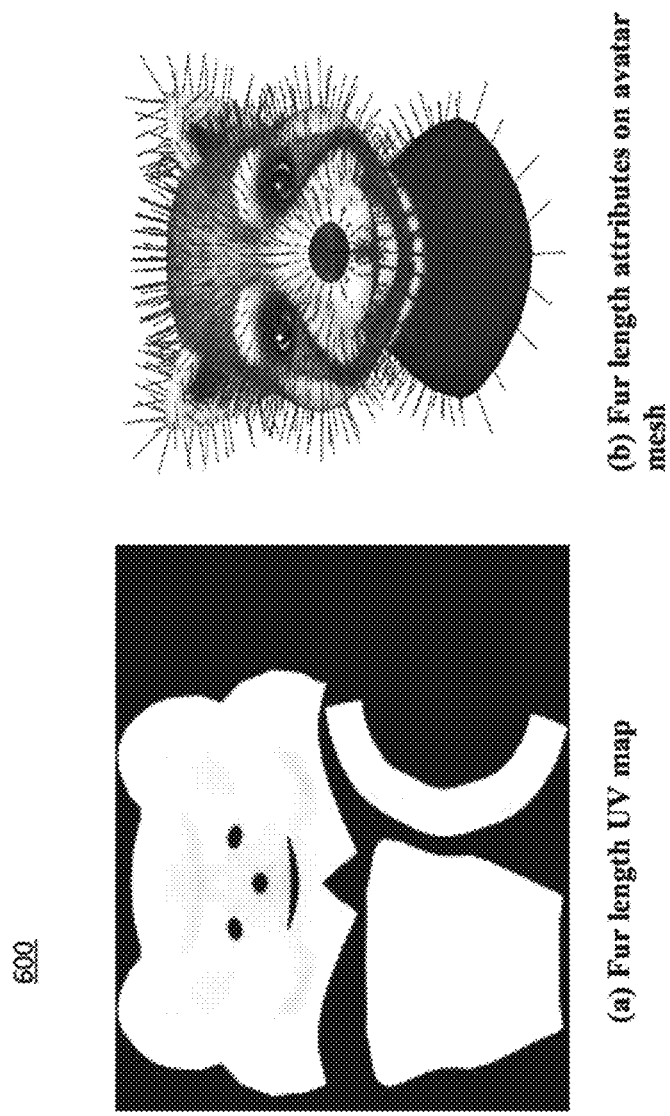

From block 204, process 200 may proceed to block 206. At block 206, various fur shell texture data maps may be made. In embodiments, the fur shell texture data maps may be two dimensional (2D) UV maps (hereinafter, simply UV maps). In embodiments, three (3) UV maps, a fur color IV map 500, a fur length UV map 600, and a fur bending direction UV map 700, as illustrated respectively in FIGS. 5-7, may be generated. In embodiments, the UV maps 500, 600 and 700 may be of the uniform dimension and layout.

In embodiments, the fur color UV map 500 may be a RGB color map. RGB color map 500 may define both the fur color of the furry area and the texture color on the avatar mesh. Further, as illustrated in section (a) of FIG. 5, RGB map 500 may include a face portion, an eyeball portion, a tongue portion, a teeth portion, and a body or cloth portion. The UV relationship between UV maps 500, 600, and 700, and the avatar mesh is shown in section (b) of FIG. 5.

In embodiments, fur length UV map 600 may be a gray color map. Gray color map 600 may define the fur length attributes of a furry avatar. Each pixel in map 600 may have different value, e.g., with the darker of the color depicting the shorter of the fur length on the avatar mesh, and the lighter of the color depicting the longer of the fur length on the avatar mesh. For visualization, the length attributes on the avatar mesh according to the defined fur length UV map 600 is shown in section (b) of FIG. 6.

In embodiments, the fur bending UV map 700 (also referred to as a vector field UV map) may be a pair of RGB and Alpha color maps (also referred to as a RGBA map). The RGBA map may define the bending force on the fur strands. Each pixel in the RGBA map may contain 4-channel color value, e.g., with the RGB-channels representing the vector direction of the bending force (R channel—x-coordinate, G channel—y-coordinate, B channel—z-coordinate), while the A-channel (alpha-channel) representing the magnitude of the bending force. In embodiments, the darker of the alpha-color, the smaller of the magnitude of the bending force on a vertex of the avatar mesh. For illustration, the vector field attributes on the avatar mesh according to the defined vector field UV map 700 is as shown in section (b) of FIG. 7. On each vertex of the avatar mesh, the beginning of the bending force may be marked with one color line, e.g., a red line, and the end of bending force may be marked with another color line, e.g., a blue line. The line length may represent the vector magnitude of the bending force.

Figure 8:
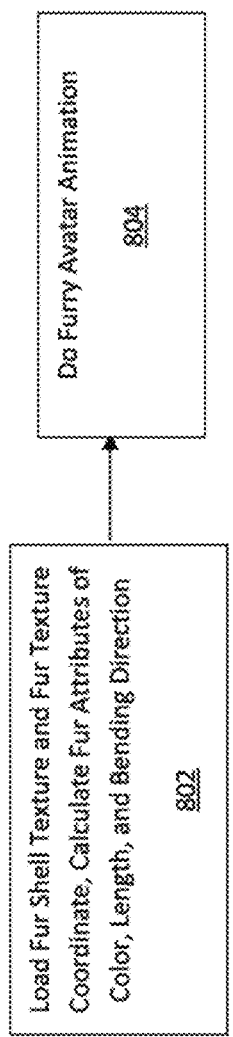
FIG. 8 illustrates an example process for animating/rendering a furry avatar, using fur shell text data maps, according to the disclosed embodiments.

Referring now to FIG. 8, wherein a flow diagram illustrating a process for animating a furry avatar, according to the disclosed embodiments, is shown. As illustrated, process 800 for animating an avatar, including replication of facial expression on the avatar that factors in head rotation impact, may include operations performed at block 802-804. The operations may be performed by, e.g., avatar animation engine 104 of FIG. 1.

Process 800 may start at block 802. At block 802, fur shell texture and fur texture coordinate, e.g., in the form of the earlier described UV maps, may be loaded for use in animation of a furry avatar. Then, during the fur attributes calculation stage, with the UV coordinates of a vertex, its fur attributes may be obtained using the three UV maps 500, 600 and 700, including the fur color, the fur length, and the fur bending direction.

From block 802, process 800 may proceed to block 804. At block 804, an avatar model may be driven to animate the furry avatar. The animation may include calculation of the vertex positions, and vertex shading. The vertex position calculation may be performed in accordance with formulas (2) and (3):

$$p_v^i = p_v + L_v \times \frac{i}{S} \times N_v, \qquad (2)$$

$$vp_v^i = p_v^i + V_v \times \sum_{j=0}^{i} \left(\frac{i}{S} \times M_v\right). \qquad (3)$$

where
$p_v$ is v-th vertex position in the avatar model;
$p_v^i$ is the corresponding vertex position of the i-th layer, without taking into count of the impact of bending force vector $V_v$;
S is the total layer number of the multi-layer texture representation;
$vp_v^i$ is the final vertex position in the i-th layer texture with taking into account of bending force vector $V_v$ on the v-th vertex of the avatar model;
$N_v$ is the normal vector;
$L_v$ is the fur length attribute for the v-th vertex position in the avatar model; and
$M_v$ is the magnitude value of the bending force vector.

Via the above calculation, the vertex positions of each layer in the fur shell texture may be determined with the defined fur length and fur bending direction.

In embodiments, vertex shading may be performed in accordance with formula (4):

$$\text{FurShading} = k_a + k_d \times C_v \times T_v^i \times (1-(N_v \times L)^2)^{pd/2} + k_s \times (1-(N_v \times H_v)^2)^{ps/2}. \quad (4)$$

where $C_v$ is the fur color attribute of the v-th vertex in the avatar model;

$T_v^i$ represents the RGB-color value of i-th layer defined in the fur shell texture;

$k_a$, $k_d$ and $k_s$ respectively stand for the ambient color, diffuse color and the specular color of global setting of fur;

pd and ps respectively stand for the ratio of the diffuse lighting and specular lighting;

L is the lighting direction vector;

$H_v$ is the bi-normal vector, which is the bisecting direction between the normal vector $N_v$ and the lighting direction vector L.

In embodiments, while in the vertex shading stage, the calculated fur shading color from different layers may be blended from 0-th layer to S-th layer, by using the alpha-color value defined in the fur shell texture.

Figure 9:
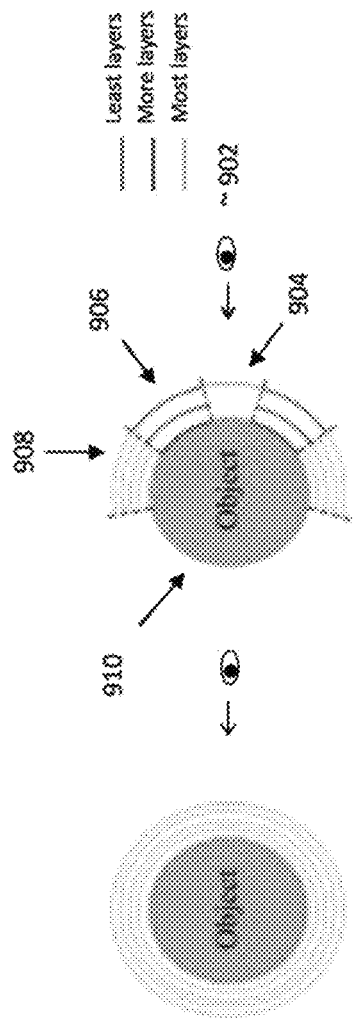
FIG. 9 illustrates variable employment of sampling planes, according to the disclosed embodiments.

Additionally, avatar animation engine 104 may be configured to support non-even fur distribution. In embodiments, under the non-even fur distribution method, the number for layers of alpha-blending may be decreased, so the rendering speed performance can be enhanced. In embodiments, the fur may be represented using N sampling layers/planes. To speed up animation, the non-even fur distribution may be realized by avatar animation engine 104 employing n1 number of sampling planes for blending for a first area 904 of the furry avatar directly in the direction of sight 902, and n2 number of sampling planes for blending for a second area 906 of the furry avatar immediately adjacent to the first area 904, as shown in FIG. 9. N, n1, and n2 are integers, with N greater than n2, and n2 greater than n1. Further, for an area 908 immediately adjacent to the second area 906 (on area removed from the area 904), avatar animation engine 104 may employ n3 number of sampling planes for blending, wherein n3 is an integer greater than n2. Still further, avatar animation engine 104 may employ zero number of sampling planes for a back area 910 of the furry avatar not visible in the direction of sight 902.

For example, for a furry avatar with a 16-layer shell texture, to speed up animation, the non-even fur distribution can be realized by representing fur as 16-layer, 8-layer, 4-layer, or 0-layer (the back of the avatar), by judging the current view sight direction 902. That is, the least number of layers may be considered for an area 904 of the avatar directly in front the view sight direction 902. In contrast, more layers may be considered for an area 906 that is immediately adjacent to the area 904 directly in front of the view sight direction. Further, still more layers may be considered for an area 908 that is adjacent to area 906 (one area removed from the area 904 directly in front of the view sight direction 902). Last but not least, no layer may be considered for an area 910 that is on a side opposite to the side of the area 904 directly in front of the view sight direction 902.

Figure 10:
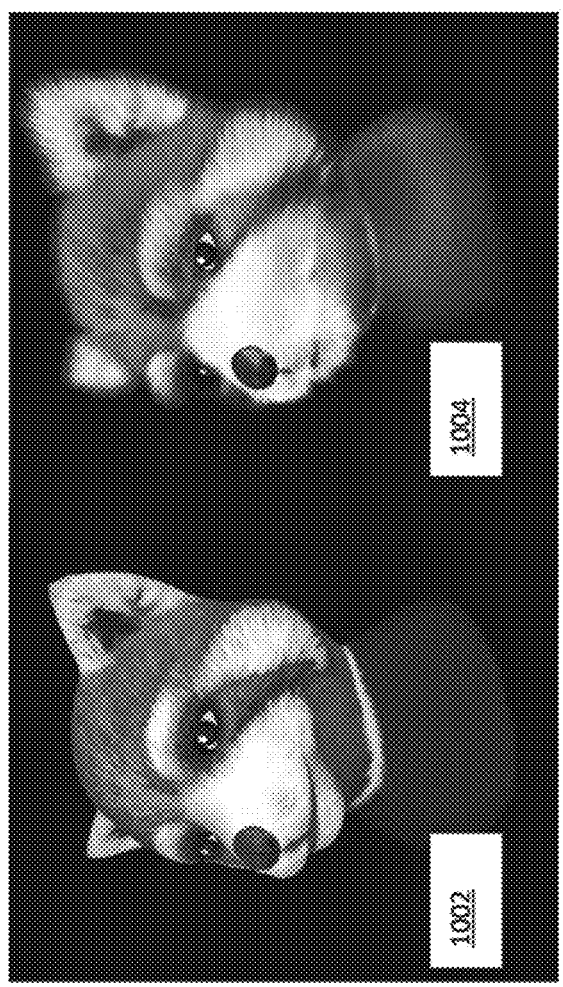
FIG. 10 illustrates an example avatar animation, with and without the fur technology, according to the disclosed embodiments.

FIG. 10 illustrates an example avatar animation, with and without employment of the fur shell texture technology of the present disclosure. As shown, image 1002 illustrates a facial expression animation of a furry avatar without employment of the fur shell texture technology of the present disclosure. Image 1004 illustrates a facial expression animation of a furry avatar with employment of the fur shell texture technology of the present disclosure, as earlier described. Image 1004 provides a richer experience to the user.

Figure 11:
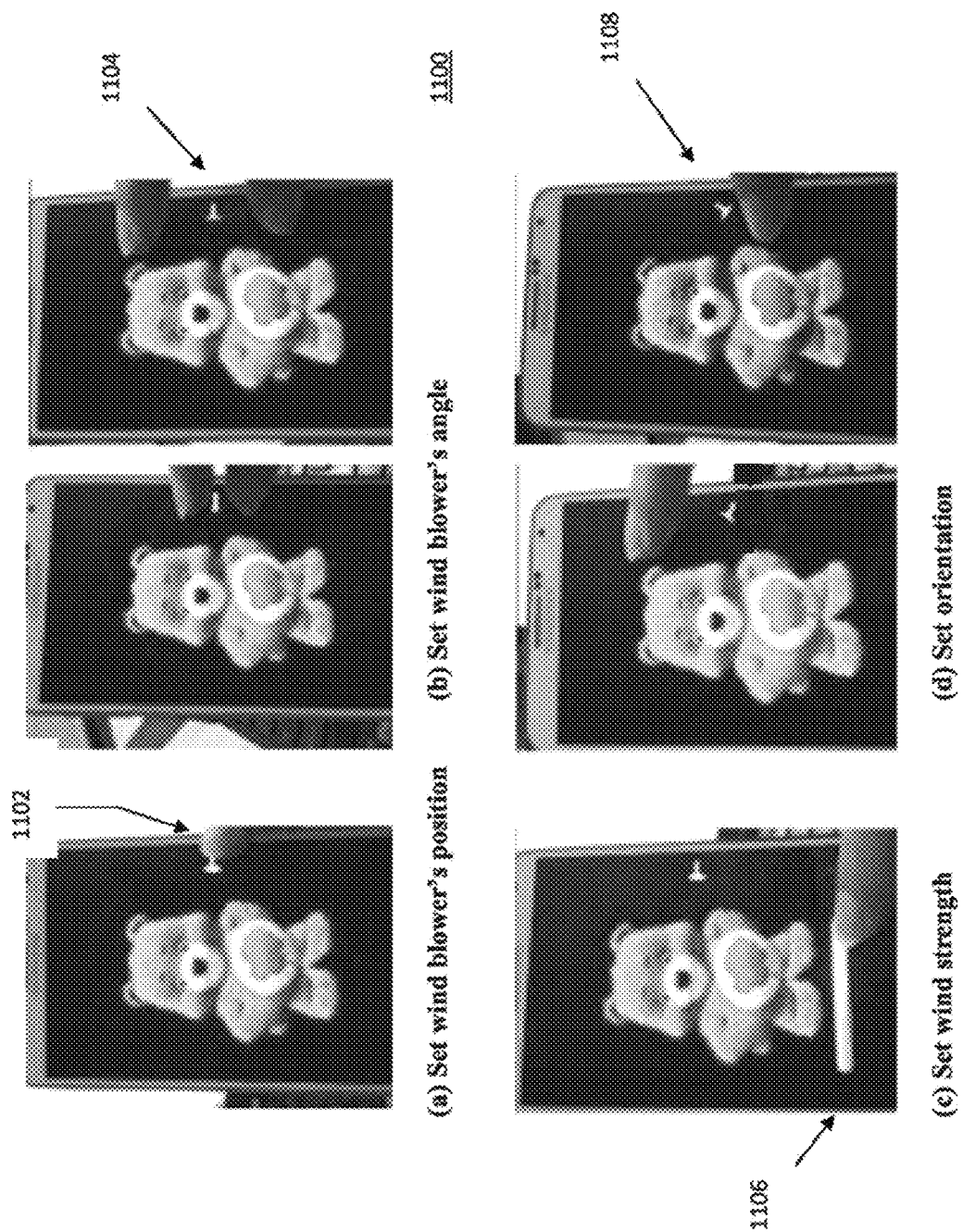
FIGS. 11-12 illustrate example processes for interacting with a furry animation, according to the disclosed embodiments.
Figure 12:
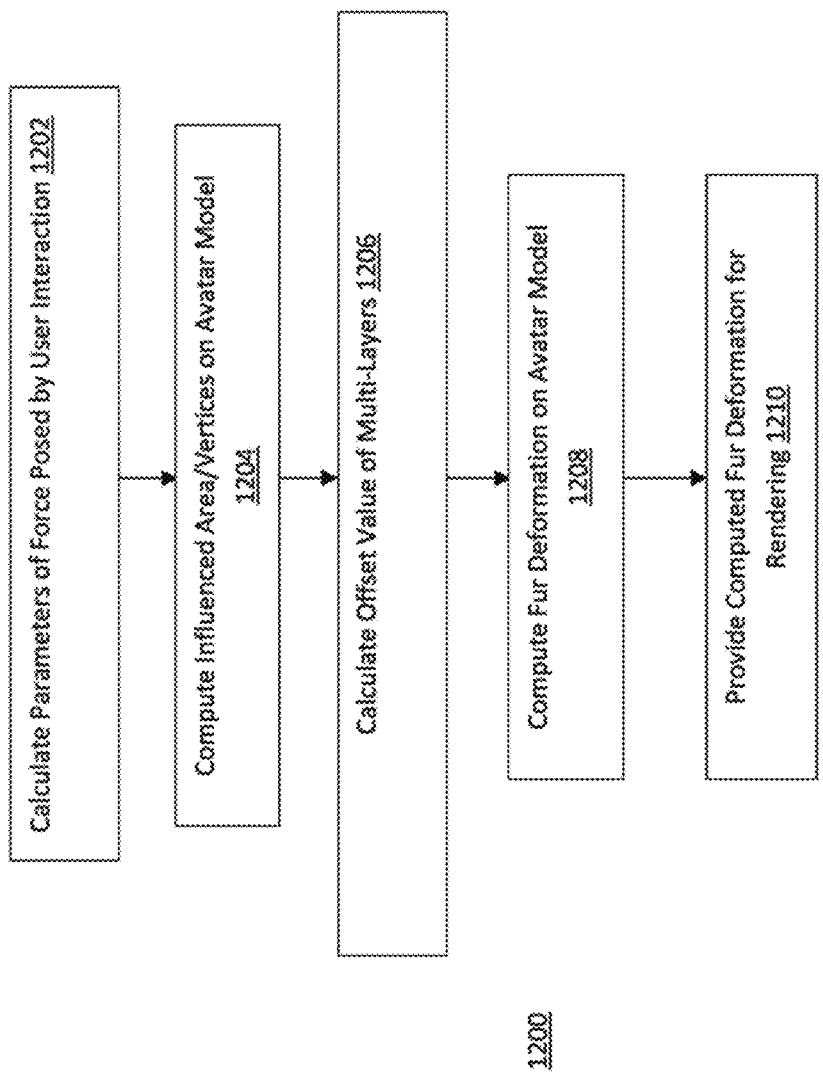

Referring now to FIGS. 11-12, wherein example processes for interacting with a furry animation, according to the disclosed embodiments, are illustrated. As shown, the example processes may include process 1100 for facilitating a user in interacting with a furry avatar animation, and process 1200 for modifying the furry avatar animation in response to the user interaction. As illustrated, process 1100 may include operations to facilitate user actions 1102-1108, and process 1200 may include operations at blocks 1202-1210 to respond to user actions 1102-1108. In embodiments, operations to facilitate user actions 1102-1108, and operations at blocks 1202-1210 may be performed e.g., by avatar animation engine 104 of FIG. 1.

Process 1100 may start with facilitating a user in positioning a virtual wind blower 1102. For example, in an embodiment where the device includes a touch screen, such as a smartphone, at 1102, the user may be facilitated in dragging an icon of the virtual wind blower and dropping the icon, using the user's finger, to set the desired position of the virtual wind blower. Further, the facilitation may include reporting of the detected dropped point/location. Next, at 1104, the user may be facilitated to set an angle of the virtual wind blower. For example, the user may be facilitated in using two of the user's fingers to set the angle of the virtual wind blow. The blowing angle may be calculated by the distance of detected multi-points. Next at 1106, the user may be facilitated to set the strength of the blowing wind. For example, the user may be facilitated in setting the strength of the blowing wind via touching and sliding a strength bar. Last, but not least, at 1108, a user may be facilitated in changing the blowing orientation of the virtual wind blower. For example, the user may be facilitated in changing blowing orientation of the virtual wind blower by flipping the user's finger.

In embodiments, e.g., on mobile devices, the facilitation of user interactions may be triggered by any one of a number of pre-defined user events, such as entry of a command, selection of a menu option, touching the touch screen in a particular manner, shaking the mobile device, detection of certain facial gestures (e.g., the user blowing with his/her mouth), user gestures, or voice comments, and so forth.

Process 1200 may start at block 1202. At 1202, the parameters depicting the user interaction, such as location of the source of wind, its direction, strength and so forth, may be calculated, based on the inputs provided by the user. In embodiments, the parameters may be captured in the form of a wind vector, with origin, direction and magnitude depicting the source, direction and strength respectively. Next, at 1204, the area and vertices of the avatar model influenced by the interactions may be calculated. In embodiments, the wind vector on each vertex of the avatar model may first be calculated. Then the tangent vector of the wind vector may be computed, and used to estimate the fur bending status. For example, in the above described example interaction, the surface area of the furry avatar impacted by the wind, and the amount of impact on the fur strands in the area, in view of the wind source's direction, angle and strength, may be determined.

Figure 13:
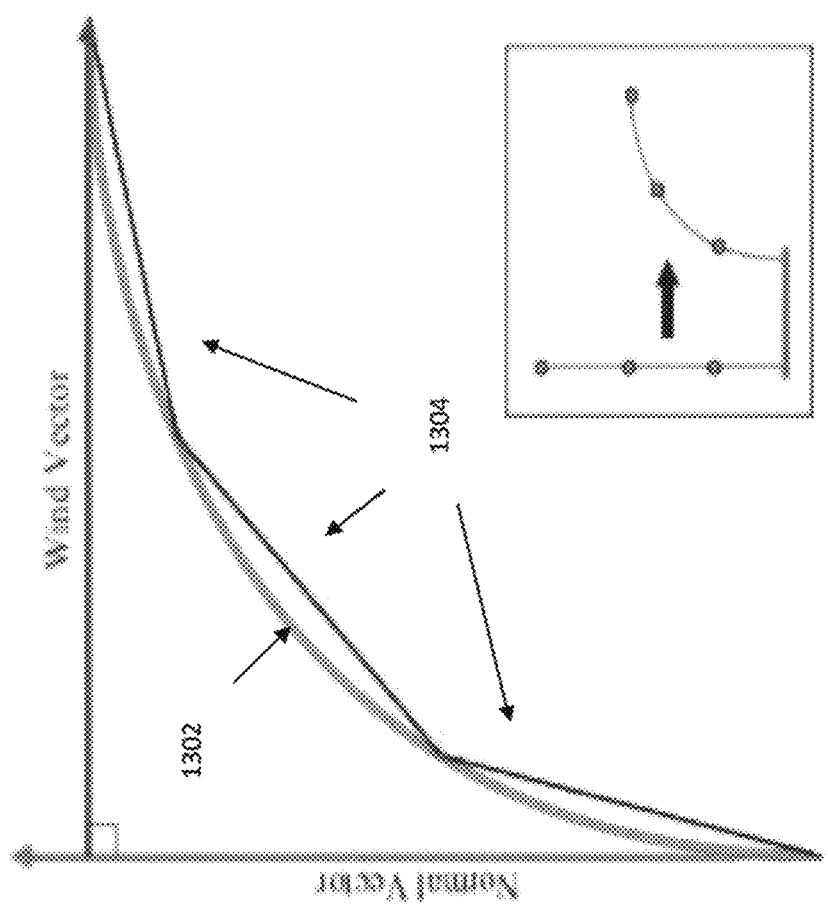
FIG. 13 illustrates an example modeling of a fur strand with multiple segments, according to the disclosed embodiments.

Next, at block 1206, the offset values of the fur strands at the various horizontal sampling layers/planes may be calculated. In embodiments, the offset values of the fur strands may be calculated employing a segment model with constant length segments to model the fur strands (as illustrated with fur strand 1302 and segments 1304 in FIG. 13), and in accordance with formula (5) as follows:

$$\text{Off}_i = L'_i \cdot (1 - e^{-s \cdot e^{v_f}}) \tag{5}$$

where i stands for the $i^{th}$ segment of the fur strand;
$\text{Off}_i$ is the offset value of $i^{th}$ segments;
s is the bending stiffness of the fur fiber;
$L'_i$ stands for the scalar length of $i^{th}$ segment; and
$v_f$ is the force vector added on the fur fiber.

At block 1208, fur deformation on the avatar model may be calculated. In embodiments, the fur deformation on the avatar model may be calculated using the offset values calculated for the various segments of the fur strands within the influenced area. Using the calculated offset values for the various segments of the fur strands within the influenced area, the various horizontal sampling layers/planes may be moved. In embodiments where the computing platform includes a graphics processor unit (GPU) with a pipeline that include a vertex shader with parallel processing capability, to provide realistic fast response to the user action, the calculation for each horizontal sampling layer/plane may be performed using the vertex shader. The vertex shader may be employed to transform each vertex's 3D position in virtual space to the 2D coordinate at which it appears on the screen. Additionally, the vertex shader may be employed to manipulate the vertex's properties, includes position, color and texture coordinate, as well as employed to calculate the offset values of each vertex.

At block 1210, the computed deformation may be provided to be factored into the animation, and ultimately rendering of the furry avatar.

Figure 14:
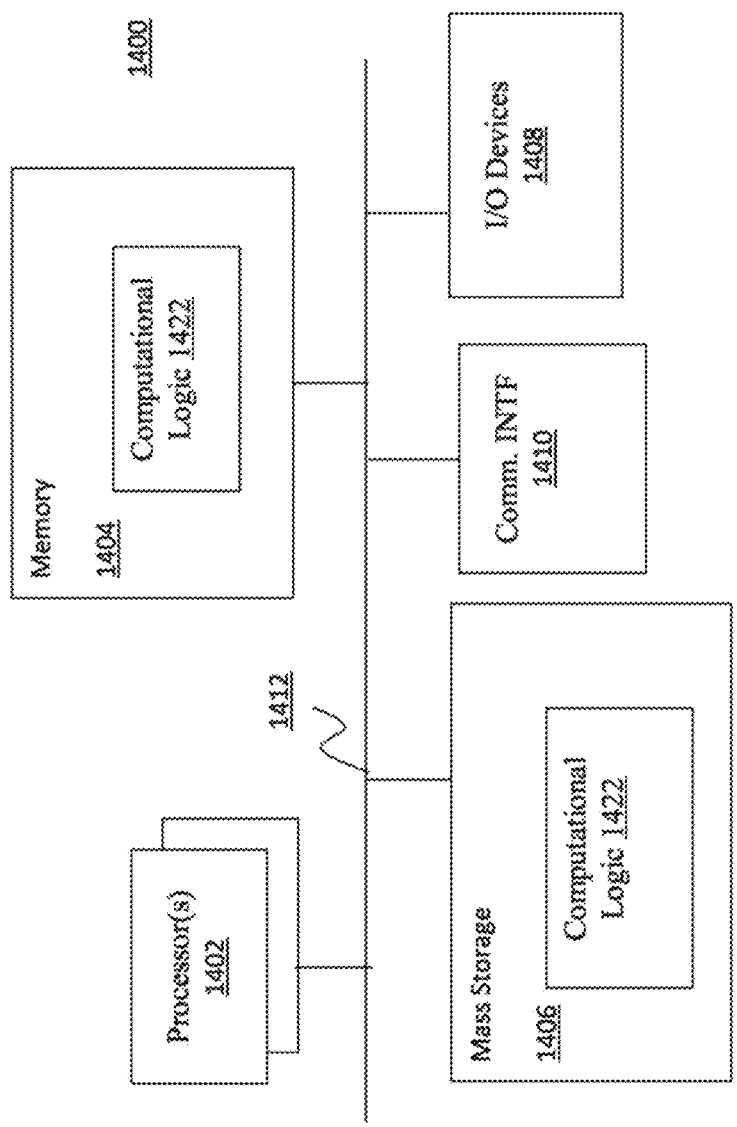
FIG. 14 illustrates an example computer system suitable for use to practice various aspects of the present disclosure, according to the disclosed embodiments.

FIG. 14 illustrates an example computer system that may be suitable for use as a client device or a server to practice selected aspects of the present disclosure. As shown, computer 1400 may include one or more processors or processor cores 1402, and system memory 1404. For the purpose of this application, including the claims, the terms "processor" and "processor cores" may be considered synonymous, unless the context clearly requires otherwise. Additionally, computer 1400 may include mass storage devices 1406 (such as diskette, hard drive, compact disc read only memory (CD-ROM) and so forth), input/output devices 1408 (such as display, keyboard, cursor control and so forth) and communication interfaces 1410 (such as network interface cards, modems and so forth). The elements may be coupled to each other via system bus 1412, which may represent one or more buses. In the case of multiple buses, they may be bridged by one or more bus bridges (not shown).

Each of these elements may perform its conventional functions known in the art. In particular, system memory 1404 and mass storage devices 1406 may be employed to store a working copy and a permanent copy of the programming instructions implementing the operations associated with face and/or head pose tracker 102, avatar animation engine 104, avatar rendering engine 106, and/or fur shell texture data map generator 108, earlier described, collectively referred to as computational logic 1422. The various elements may be implemented by assembler instructions supported by processor(s) 1402 or high-level languages, such as, for example, C, that can be compiled into such instructions.

The number, capability and/or capacity of these elements 1410-1412 may vary, depending on whether computer 1400 is used as a client device or a server. When use as client device, the capability and/or capacity of these elements 1410-1412 may vary, depending on whether the client device is a stationary or mobile device, like a smartphone, computing tablet, ultrabook or laptop. Otherwise, the constitutions of elements 1410-1412 are known, and accordingly will not be further described.

Figure 15:
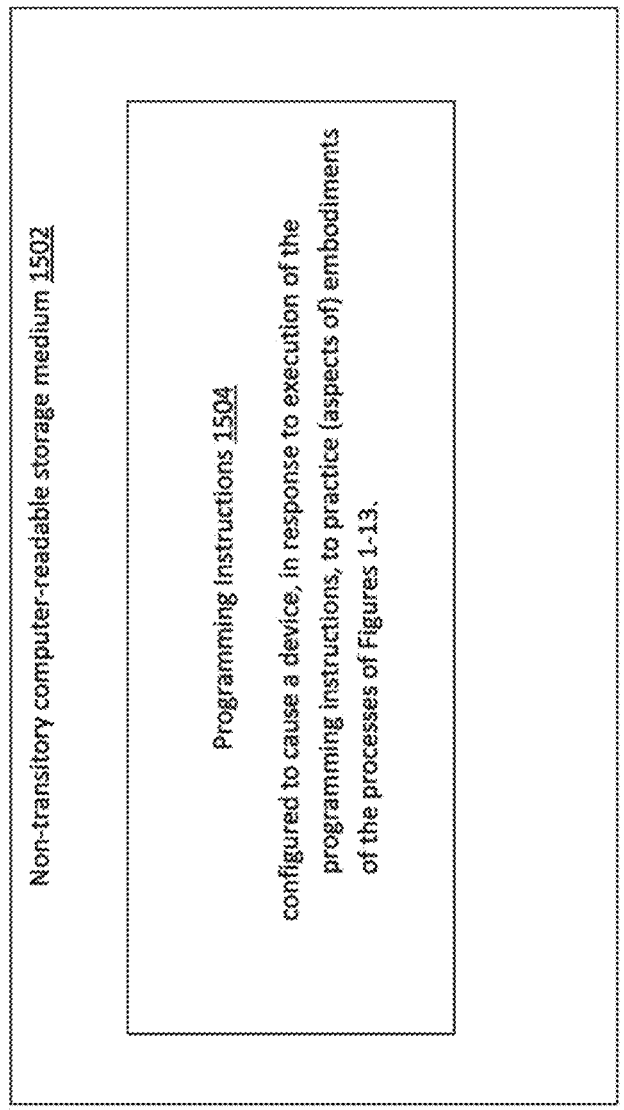
FIG. 15 illustrates a storage medium having instructions for practicing methods described with references to FIGS. 1-13, according to disclosed embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 15 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1502 may include a number of programming instructions 1504. Programming instructions 1504 may be configured to enable a device, e.g., computer 1400, in response to execution of the programming instructions, to perform, e.g., various operations associated with face and/or head pose tracker 102, avatar animation engine 104, avatar rendering engine 106, and/or fur shell texture data map generator 108. In alternate embodiments, programming instructions 1504 may be disposed on multiple computer-readable non-transitory storage media 1502 instead. In alternate embodiments, programming instructions 1504 may be disposed on computer-readable transitory storage media 1502, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 14, for one embodiment, at least one of processors 1402 may be packaged together with memory having computational logic 1422 (in lieu of storing on memory 1404 and storage 1406). For one embodiment, at least one of processors 1402 may be packaged together with memory having computational logic 1422 to form a System in Package (SiP). For one embodiment, at least one of processors 1402 may be integrated on the same die with memory having computational logic 1422. For one embodiment, at least one of processors 1402 may be packaged together with memory having computational logic 1422 to form a System on Chip (SoC). For at least one embodiment, the SoC may be utilized in, e.g., but not limited to, a smartphone or computing tablet.

Thus various example embodiments of the present disclosure have been described including, but are not limited to:

Example 1 may be an apparatus for rendering avatars. The apparatus may comprise one or more processors, and an avatar animation engine. The avatar animation engine may be operated by the one or more processors, to receive a plurality of fur shell texture data maps associated with a furry avatar, and drive an avatar model to animate the furry avatar, using the plurality of fur shell texture data maps. The plurality of fur shell texture data maps may be generated through sampling of fur strands across a plurality of horizontal planes.

Example 2 may be example 1, wherein the plurality fur shell texture data maps may comprise a plurality of two dimensional, 2D, UV maps.

Example 3 may be example 2, wherein the plurality of 2D UV maps may comprise a fur color UV map, a fur length UV map, and a fur bending direction UV map.

Example 4 may be example 2 or 3 wherein the plurality of 2D UV maps may be uniform in dimension and layout.

Example 5 may be example 2, 3 or 4, wherein the avatar animation engine may calculate fur attributes for a plurality of vertices of a mesh of the avatar model, using the plurality of 2D UV maps.

Example 6 may be example 5, wherein the avatar animation engine may determine shading for the plurality of vertices of the mesh, based at least in part on the fur attributes.

Example 7 may be example 6, wherein the avatar animation engine may determine shading via:

first determination of initial corresponding positions of the plurality of vertices of the mesh in the horizontal sampling planes without taking into consideration of bending forces;

second determination of final corresponding positions of the plurality of vertices of the mesh in the horizontal sampling planes taking into consideration of bending forces;

third determination of color attributes for the final corresponding positions of the plurality of vertices of the mesh in the horizontal sampling planes; and blending of the color attributes for the final corresponding positions of the plurality of vertices of the mesh in the horizontal sampling planes.

Example 8 may be example 7, wherein the avatar animation engine may further vary the number of horizontal sampling planes employed in blending based at least in part on a direction of sight.

Example 9 may be example 8, wherein the number of horizontal sampling planes may comprise N sampling planes, and the avatar animation engine may employ n1 number of sampling planes for blending for a first area of the furry avatar directly in the direction of sight, and n2 number of sampling planes for blending for a second area of the furry avatar immediately adjacent to the first area, wherein N, n1, and n2 are integers, with N greater than n2, and n2 greater than n1.

Example 10 may be example 9, wherein the avatar animation engine may employ n3 number of sampling planes for blending for a third area of the furry avatar immediately adjacent to the second area, and one area removed from the first area, wherein n3 is an integer greater than n2.

Example 11 may be example 9 or 10, wherein the avatar animation engine may employ zero number of sampling planes for a back area of the furry avatar not visible in the direction of sight.

Example 12 may be any one of claims 1-11, wherein the avatar animation engine may further determine an area of the furry avatar influenced by a force, and deformation of fur strands within the area caused by the force, and adapt the animation to reflect the deformation of the fur strands within the influenced area, based at least in part on a plurality of parameters depicting the force.

Example 13 may be example 12, wherein the avatar animation engine, as part of the determination of deformation of the fur strands within the influenced area, may determine various offsets of the fur strands at the various horizontal sampling planes.

Example 14 may be example 13, wherein the avatar animation engine, as part of the determination of offsets of the fur strands at the various horizontal sampling planes, may model a fur strand with a segment model of constant segment lengths.

Example 15 may be example 13 or 14, wherein the avatar animation engine, as part of the adaptation of the animation, may determine fur deformation on the avatar model, using the various offsets determined for the fur strands.

Example 16 may be an apparatus for generating fur shell texture data for furry avatars. The apparatus may comprise one or more processors, and a fur shell texture data generator. The fur shell texture data generator may be operated by the one or more processors, to sample fur strands of a furry avatar across a plurality of horizontal planes; and generate one or more fur shell texture data maps to depict color(s), length(s) or bending direction(s) of the fur strands.

Example 17 may be example 16, wherein the fur shell texture data generator may generate the one or more fur shell texture data maps in a form of one or more two dimensional, 2D, UV maps that include a fur color UV map, a fur length UV map, or a fur bending direction UV map.

Example 18 may be example 17, wherein the one or more 2D UV maps may be uniform in dimension and layout.

Example 19 may be example 17 or 18, wherein the fur color UV map may be a RGB map that defines fur color of furry area of the furry avatar and texture color of a mesh of an avatar model of the furry avatar.

Example 20 may be example 17, 18 or 19, wherein the fur length UV map may be a gray color map that defines fur strand lengths of furry avatar, with darker color depicting shorter fur strand length, and lighter color depicting longer fur stand length.

Example 21 may be any one of examples 17-20, wherein the fur bending direction UV map may be a RGBA map that defines bending force on the fur stands, with each pixel in the map having 4-channel color value, in which the RGB-channel represents a vector direction (x, y, and z) of the bending force, and the A-channel represents the magnitude of the bending force.

Example 22 may be an apparatus for rendering avatars. The apparatus may comprise one or more processors, and an avatar animation engine. The avatar animation engine may be operated by the one or more processors, to drive an avatar model to animate a furry avatar; wherein the avatar animation engine may determine an area of the furry avatar influenced by a force, and deformation of fur strands within the area caused by the force, and adapt the animation to reflect the deformation of the fur strands within the influenced area, based at least in part on a plurality of parameters depicting the force.

Example 23 may be example 22, wherein the avatar animation engine may facilitate a user in specifying the force; and wherein the plurality of parameters depicting the force includes a location of a source of the force, a direction of the force, or a strength of the force.

Example 24 may be example 22 or 23, wherein the avatar animation engine may employ a plurality of fur shell texture data maps in animation the furry avatar, the plurality of fur shell texture data maps having been generated through sampling of fur strands across a plurality of horizontal planes; and wherein the avatar animation engine, as part of the determination of deformation of the fur strands within the influenced area, may determine various offsets of the fur strands at the various horizontal sampling planes.

Example 25 may be example 24, wherein the avatar animation engine, as part of the determination of offsets of the fur strands at the various horizontal sampling planes, may model a fur strand with a segment model of constant segment lengths.

Example 26 may be example 24 or 25, wherein the avatar animation engine, as part of the adaptation of the animation, may determine fur deformation on the avatar model, using the various offsets determined for the fur strands.

Example 27 may be a method for rendering avatars. The method may comprise: receiving, by a computing device, a plurality of fur shell texture data maps associated with a furry avatar, and driving an avatar model, by the computing device, to animate the furry avatar, using the plurality of fur shell texture data maps. The plurality of fur shell texture data maps may be generated through sampling of fur strands across a plurality of horizontal planes.

Example 28 may be example 27, wherein receiving a plurality of fur shell texture data maps may comprise receiving a plurality of two dimensional, 2D, UV maps.

Example 29 may be example 28, wherein receiving a plurality of 2D UV maps may comprise receiving a fur color UV map, a fur length UV map, and a fur bending direction UV map.

Example 30 may be example 28 or 29, wherein receiving a plurality of 2D UV maps may comprise receiving a plurality of 2D UV maps that are uniform in dimension and layout.

Example 31 may be example 28, 29 or 30, further comprising calculating fur attributes for a plurality of vertices of a mesh of the avatar model, by the computing device, using the plurality of 2D UV maps.

Example 32 may be example 31, further comprising determining shading for the plurality of vertices of the mesh, by the computing device, based at least in part on the fur attributes.

Example 33 may be example 32, wherein determining shading may comprise:

first determining initial corresponding positions of the plurality of vertices of the mesh in the horizontal sampling planes without taking into consideration of bending forces;

second determining final corresponding positions of the plurality of vertices of the mesh in the horizontal sampling planes taking into consideration of bending forces;

third determining color attributes for the final corresponding positions of the plurality of vertices of the mesh in the horizontal sampling planes; and blending the color attributes for the final corresponding positions of the plurality of vertices of the mesh in the horizontal sampling planes.

Example 34 may be example 33, further comprising varying, by the computing device, the number of horizontal sampling planes employed in blending based at least in part on a direction of sight.

Example 35 may be example 34, wherein the number of horizontal sampling planes may comprise N sampling planes, and employing the horizontal sampling planes may comprise employing n1 number of sampling planes for blending for a first area of the furry avatar directly in the direction of sight, and n2 number of sampling planes for blending for a second area of the furry avatar immediately adjacent to the first area, wherein N, n1, and n2 are integers, with N greater than n2, and n2 greater than n1.

Example 36 may be example 35, wherein employing the horizontal sampling planes may further comprise employing n3 number of sampling planes for blending for a third area of the furry avatar immediately adjacent to the second area, and one area removed from the first area, wherein n3 is an integer greater than n2.

Example 37 may be example 35 or 36, wherein employing the horizontal sampling planes may comprise employing zero number of sampling planes for a back area of the furry avatar not visible in the direction of sight.

Example 38 may be any one of examples 27-37, further comprising determining, by the computing device, an area of the furry avatar influenced by a force, and deformation of fur strands within the area caused by the force, and adapting, by the computing device, the animation to reflect the deformation of the fur strands within the influenced area, based at least in part on a plurality of parameters depicting the force.

Example 39 may be example 38, further comprising, as part of determining deformation of the fur strands within the influenced area, determining various offsets of the fur strands at the various horizontal sampling planes.

Example 40 may be example 39, further comprising, as part of the determination of offsets of the fur strands at the various horizontal sampling planes, modeling a fur strand with a segment model of constant segment lengths.

Example 41 may be example 39, further comprising, as part of the adaptation of the animation, determining fur deformation on the avatar model, using the various offsets determined for the fur strands.

Example 42 may be a method for generating fur shell texture data for a furry avatar. The method may comprise: sampling, by a computing device, fur strands of the furry avatar across a plurality of horizontal planes; and generating, by the computing device, one or more fur shell texture data maps to depict color(s), length(s) or bending direction(s) of the fur strands.

Example 43 may be example 42, wherein generating may comprise generating the one or more fur shell texture data maps in a form of one or more two dimensional, 2D, UV maps that include a fur color UV map, a fur length UV map, or a fur bending direction UV map.

Example 44 may be example 43, wherein generating the one or more 2D UV maps may comprise generating one or more 2D UV maps that are uniform in dimension and layout.

Example 45 may be example 43 or 44, wherein generating a fur color UV map may comprise generating a RGB map that defines fur color of furry area of the furry avatar and texture color of a mesh of an avatar model of the furry avatar.

Example 46 may be example 43, 44 or 45, wherein generating a fur length UV map may comprise generating a gray color map that defines fur strand lengths of furry avatar, with darker color depicting shorter fur strand length, and lighter color depicting longer fur stand length.

Example 47 may be any one of examples 43-46, wherein generating a fur bending direction UV map may comprise generating a RGBA map that defines bending force on the fur stands, with each pixel in the map having 4-channel color value, in which the RGB-channel represents a vector direction (x, y, and z) of the bending force, and the A-channel represents the magnitude of the bending force.

Example 48 may be a method for rendering avatars. The method may comprise driving an avatar model, by a computing device, to animate a furry avatar, including: determining an area of the furry avatar influenced by a force, determining deformation of fur strands within the area caused by the force, and adapting the animation to reflect the deformation of the fur strands within the influenced area, based at least in part on a plurality of parameters depicting the force.

Example 49 may be example 48, further comprising facilitating a user, by the computing device, in specifying the force, wherein the plurality of parameters depicting the force includes a location of a source of the force, a direction of the force, or a strength of the force.

Example 50 may be example 48 or 49, wherein driving the avatar model may include employing a plurality of fur shell texture data maps associated with the furry avatar, the plurality of fur shell texture data maps having been generated through sampling of fur strands across a plurality of horizontal planes; and wherein the method further may comprise, as part of determining deformation of the fur strands within the influenced area, determining various offsets of the fur strands at the various horizontal sampling planes.

Example 51 may be example 50, wherein the method may further comprise, as part of determining offsets of the fur strands at the various horizontal sampling planes, modeling a fur strand with a segment model of constant segment lengths.

Example 52 may be example 50 or 51, wherein the method may further comprise, as part of adapting the animation, determining fur deformation on the avatar model, using the various offsets determined for the fur strands.

Example 53 may be one or more computer-readable medium having a plurality of instructions, in response to execution of the instructions by a computing device, cause the computing device to: receive a plurality of fur shell texture data maps associated with a furry avatar; and drive an avatar model to animate the furry avatar, using the plurality of fur shell texture data maps. The plurality of fur shell texture data maps may be generated through sampling of fur strands across a plurality of horizontal planes.

Example 54 may be example 53, wherein the plurality fur shell texture data maps may comprise a plurality of two dimensional, 2D, UV maps.

Example 55 may be example 54, wherein the plurality of 2D UV maps may comprise a fur color UV map, a fur length UV map, and a fur bending direction UV map.

Example 56 may be example 54 or 55, wherein the plurality of 2D UV maps may be uniform in dimension and layout.

Example 57 may be example 54, 55 or 56, wherein the computing device may calculate fur attributes for a plurality of vertices of a mesh of the avatar model, using the plurality of 2D UV maps.

Example 58 may be example 57, wherein the computing device may determine shading for the plurality of vertices of the mesh, based at least in part on the fur attributes.

Example 59 may be example 58, wherein the computing device may determine shading via: first determination of initial corresponding positions of the plurality of vertices of the mesh in the horizontal sampling planes without taking into consideration of bending forces; second determination of final corresponding positions of the plurality of vertices of the mesh in the horizontal sampling planes taking into consideration of bending forces; third determination of color attributes for the final corresponding positions of the plurality of vertices of the mesh in the horizontal sampling planes; and blending of the color attributes for the final corresponding positions of the plurality of vertices of the mesh in the horizontal sampling planes.

Example 60 may be example 59, wherein the computing device may further vary the number of horizontal sampling planes employed in blending based at least in part on a direction of sight.

Example 61 may be example 60, wherein the number of horizontal sampling planes may comprise N sampling planes, and the avatar animation engine may employ n1 number of sampling planes for blending for a first area of the furry avatar directly in the direction of sight, and n2 number of sampling planes for blending for a second area of the furry avatar immediately adjacent to the first area, wherein N, n1, and n2 are integers, with N greater than n2, and n2 greater than n1.

Example 62 may be example 61, wherein the computing device may employ n3 number of sampling planes for blending for a third area of the furry avatar immediately adjacent to the second area, and one area removed from the first area, wherein n3 is an integer greater than n2.

Example 63 may be example 61 or 62, wherein the computing device may employ zero number of sampling planes for a back area of the furry avatar not visible in the direction of sight.

Example 64 may be example any one of examples 53-63, wherein the computing device may further determine an area of the furry avatar influenced by a force, and deformation of fur strands within the area caused by the force, and adapt the animation to reflect the deformation of the fur strands within the influenced area, based at least in part on a plurality of parameters depicting the force.

Example 65 may be example 64, wherein the computing device, as part of the determination of deformation of the fur strands within the influenced area, may determine various offsets of the fur strands at the various horizontal sampling planes.

Example 66 may be example 65, wherein the computing device, as part of the determination of offsets of the fur strands at the various horizontal sampling planes, may model a fur strand with a segment model of constant segment lengths.

Example 67 may be example 65 or 66, wherein the computing device, as part of the adaptation of the animation, may determine fur deformation on the avatar model, using the various offsets determined for the fur strands.

Example 68 may be one or more computer-readable medium having a plurality of instructions, in response to execution of the instructions by a computing device, cause the computing device to: sample fur strands of a furry avatar across a plurality of horizontal planes; and generate one or more fur shell texture data maps to depict color(s), length(s) or bending direction(s) of the fur strands.

Example 69 may be example 68, wherein the computing device may generate the one or more fur shell texture data maps in a form of one or more two dimensional, 2D, UV maps that include a fur color UV map, a fur length UV map, or a fur bending direction UV map.

Example 70 may be example 69, wherein the one or more 2D UV maps may be uniform in dimension and layout.

Example 71 may be example 69 or 70, wherein the fur color UV map may be a RGB map that defines fur color of furry area of the furry avatar and texture color of a mesh of an avatar model of the furry avatar.

Example 72 may be example 69, 70 or 71, wherein the fur length UV map may be a gray color map that defines fur strand lengths of furry avatar, with darker color depicting shorter fur strand length, and lighter color depicting longer fur stand length.

Example 73 may be any one of examples 69-72, wherein the fur bending direction UV map is a RGBA map that defines bending force on the fur stands, with each pixel in the map having 4-channel color value, in which the RGB-channel represents a vector direction (x, y, and z) of the bending force, and the A-channel represents the magnitude of the bending force.

Example 74 may be one or more computer-readable medium having a plurality of instructions, in response to execution of the instructions by a computing device, cause the computing device to drive an avatar model to animate a furry avatar, wherein to drive includes: to determine an area of the furry avatar influenced by a force, and deformation of fur strands within the area caused by the force, and to adapt the animation to reflect the deformation of the fur strands within the influenced area, based at least in part on a plurality of parameters depicting the force.

Example 75 may be example 74, wherein the computing device may facilitate a user in specifying the force; wherein the plurality of parameters depicting the force may include a location of a source of the force, a direction of the force, or a strength of the force.

Example 76 may be example 74 or 75, wherein the computing device may employ a plurality of fur shell texture data maps in animation the furry avatar, the plurality of fur shell texture data maps having been generated through sampling of fur strands across a plurality of horizontal planes; and wherein the avatar animation engine, as part of the determination of deformation of the fur strands within the influenced area, may determine various offsets of the fur strands at the various horizontal sampling planes.

Example 77 may be example 76, wherein the computing device, as part of the determination of offsets of the fur strands at the various horizontal sampling planes, may model a fur strand with a segment model of constant segment lengths.

Example 78 may be example 76 or 77, wherein the computing device, as part of the adaptation of the animation, may determine fur deformation on the avatar model, using the various offsets determined for the fur strands.

Example 79 may be an apparatus for rendering avatars. The apparatus may comprise avatar animation means for receiving a plurality of fur shell texture data maps associated with a furry avatar, and driving an avatar model to animate the furry avatar, using the plurality of fur shell texture data maps. The plurality of fur shell texture data maps are generated through sampling of fur strands across a plurality of horizontal planes.

Example 80 may be example 79, wherein the plurality fur shell texture data maps may comprise a plurality of two dimensional, 2D, UV maps.

Example 81 may be example 80, wherein the plurality of 2D UV maps may comprise a fur color UV map, a fur length UV map, and a fur bending direction UV map.

Example 82 may be example 80 or 81, wherein the plurality of 2D UV maps may be uniform in dimension and layout.

Example 83 may be example 80, 81 or 82, wherein the avatar animation means may comprise means for calculating fur attributes for a plurality of vertices of a mesh of the avatar model, using the plurality of 2D UV maps.

Example 84 may be example 83, wherein the avatar animation means may comprise means for determining shading for the plurality of vertices of the mesh, based at least in part on the fur attributes.

Example 85 may be example 84, wherein the avatar animation means may comprise means for determining shading by:
first determining initial corresponding positions of the plurality of vertices of the mesh in the horizontal sampling planes without taking into consideration of bending forces;
second determining final corresponding positions of the plurality of vertices of the mesh in the horizontal sampling planes taking into consideration of bending forces;
third determining color attributes for the final corresponding positions of the plurality of vertices of the mesh in the horizontal sampling planes; and
blending the color attributes for the final corresponding positions of the plurality of vertices of the mesh in the horizontal sampling planes.

Example 86 may be example 85, wherein the avatar animation means may comprise means for varying the number of horizontal sampling planes employed in blending based at least in part on a direction of sight.

Example 87 may be example 86, wherein the number of horizontal sampling planes may comprise N sampling planes, and the avatar animation means may comprise means for employing n1 number of sampling planes for blending for a first area of the furry avatar directly in the direction of sight, and n2 number of sampling planes for blending for a second area of the furry avatar immediately adjacent to the first area, wherein N, n1, and n2 are integers, with N greater than n2, and n2 greater than n1.

Example 88 may be example 87, wherein the avatar animation means may comprise means for employing n3 number of sampling planes for blending for a third area of the furry avatar immediately adjacent to the second area, and one area removed from the first area, wherein n3 is an integer greater than n2.

Example 89 may be example 88, wherein the avatar animation means may comprise means for employing zero number of sampling planes for a back area of the furry avatar not visible in the direction of sight.

Example 90 may be any one of examples 79-89, wherein the avatar animation means may comprise means for determining an area of the furry avatar influenced by a force, and deformation of fur strands within the area caused by the force, and means for adapting the animation to reflect the deformation of the fur strands within the influenced area, based at least in part on a plurality of parameters depicting the force.

Example 91 may be example 90, wherein the avatar animation means may comprise means for determining, as part of determining deformation of the fur strands within the influenced area, various offsets of the fur strands at the various horizontal sampling planes.

Example 92 may be example 91, wherein the avatar animation means may comprise means for modeling, as part of determining offsets of the fur strands at the various horizontal sampling planes, a fur strand with a segment model of constant segment lengths.

Example 93 may be example 91 or 92, wherein the avatar animation means may comprise means for determining, as part of adapting the animation, fur deformation on the avatar model, using the various offsets determined for the fur strands.

Example 94 may be an apparatus for generating fur shell texture data for furry avatars. The apparatus may comprise: fur shell texture data generation means for sampling fur strands of a furry avatar across a plurality of horizontal planes, having means for generating one or more fur shell texture data maps to depict color(s), length(s) or bending direction(s) of the fur strands.

Example 95 may be example 94, wherein means for generating one or more fur shell texture data maps may comprise means for generating the one or more fur shell texture data maps in a form of one or more two dimensional, 2D, UV maps that include a fur color UV map, a fur length UV map, or a fur bending direction UV map.

Example 96 may be example 95, wherein the one or more 2D UV maps may be uniform in dimension and layout.

Example 97 may be example 95 or 96, wherein the fur color UV map may be a RGB map that defines fur color of furry area of the furry avatar and texture color of a mesh of an avatar model of the furry avatar.

Example 98 may be example 95, 96 or 97, wherein the fur length UV map may be a gray color map that defines fur strand lengths of furry avatar, with darker color depicting shorter fur strand length, and lighter color depicting longer fur stand length.

Example 99 may be any one of examples 95-98, wherein the fur bending direction UV map may be a RGBA map that defines bending force on the fur stands, with each pixel in the map having 4-channel color value, in which the RGB-channel represents a vector direction (x, y, and z) of the bending force, and the A-channel represents the magnitude of the bending force.

Example 100 may be an apparatus for rendering avatars. The apparatus may comprise avatar animation means for driving an avatar model to animate a furry avatar, including: means for determining an area of the furry avatar influenced by a force, and deformation of fur strands within the area caused by the force, and means for adapting the animation to reflect the deformation of the fur strands within the influenced area, based at least in part on a plurality of parameters depicting the force.

Example 101 may be example 100, wherein the avatar animation means may comprise means for facilitating a user in specifying the force, wherein the plurality of parameters depicting the force includes a location of a source of the force, a direction of the force, or a strength of the force.

Example 102 may be example 100 or 101, wherein the avatar animation means may comprise means for employing a plurality of fur shell texture data maps in animation the furry avatar, the plurality of fur shell texture data maps having been generated through sampling of fur strands across a plurality of horizontal planes; and wherein the avatar animation means further may comprise means for determining, as part of determining deformation of the fur strands within the influenced area, various offsets of the fur strands at the various horizontal sampling planes.

Example 103 may be example 102, wherein the avatar animation means may comprise means for modeling, as part of determining offsets of the fur strands at the various horizontal sampling planes, a fur strand with a segment model of constant segment lengths.

Example 104 may be example 102 or 103, wherein the avatar animation means may comprise means for determining, as part of adapting the animation, fur deformation on the avatar model, using the various offsets determined for the fur strands.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A pocket avatar apparatus for rendering avatars, comprising:
   one or more processors; and
   an avatar animation engine, to be operated by the one or more processors, to receive a plurality of fur shell texture data maps associated with rendering fur texture of a furry avatar under a predetermined number of conditions, and drive an avatar model to animate the furry avatar, using the plurality of fur shell texture data maps;
   wherein the plurality of fur shell texture data maps for the predetermined number of conditions are pre-generated and provided to the avatar animation engine, prior to the avatar animation engine driving the avatar model, by a fur shell texture data map generator, and the plurality of fur shell texture data maps are pre-generated by the fur shell texture data map generator through sampling of fur strands across a plurality of horizontal planes under the predetermined number of conditions; and
   wherein the pocket avatar apparatus is a mobile device.

2. The pocket avatar apparatus of claim 1, wherein the plurality fur shell texture data maps comprises a plurality of two dimensional, 2D, UV maps.

3. The pocket avatar apparatus of claim 1, wherein the avatar animation engine is to further determine an area of the furry avatar influenced by a force, and deformation of fur strands within the area caused by the force, and adapt the animation to reflect the deformation of the fur strands within the influenced area, based at least in part on a plurality of parameters depicting the force.

4. The pocket avatar apparatus of claim 3, wherein the avatar animation engine, as part of the determination of deformation of the fur strands within the influenced area, is to determine various offsets of the fur strands at the various horizontal sampling planes.

5. The pocket avatar apparatus of claim 4, wherein the avatar animation engine, as part of the determination of offsets of the fur strands at the various horizontal sampling planes, is to model a fur strand with a segment model of constant segment lengths.

6. The pocket avatar apparatus of claim 4, wherein the avatar animation engine, as part of the adaptation of the animation, is to determine fur deformation on the avatar model, using the various offsets determined for the fur strands.

7. The pocket avatar apparatus of claim 2, wherein the plurality of 2D UV maps comprise a fur color UV map, a fur length UV map, and a fur bending direction UV map.

8. The pocket avatar apparatus of claim 2, wherein the plurality of 2D UV maps are uniform in dimension and layout.

9. The pocket avatar apparatus of claim 2, wherein the avatar animation engine is to calculate fur attributes for a plurality of vertices of a mesh of the avatar model, using the plurality of UV maps.

10. The pocket avatar apparatus of claim 9, wherein the avatar animation engine is to determine shading for the plurality of vertices of the mesh, based at least in part on the fur attributes.

11. The pocket avatar apparatus of claim 10, wherein the avatar animation engine is to determine shading via:
   first determination of initial corresponding positions of the plurality of vertices of the mesh in the horizontal sampling planes without taking into consideration bending forces;
   second determination of final corresponding positions of the plurality of vertices of the mesh in the horizontal sampling planes taking into consideration bending forces;
   third determination of color attributes for the final corresponding positions of the plurality of vertices of the mesh in the horizontal sampling planes; and blending of the color attributes for the final corresponding positions of the plurality of vertices of the mesh in the horizontal sampling planes.

12. The pocket avatar apparatus of claim 11, wherein the avatar animation engine is to further vary the number of horizontal sampling planes employed in blending based at least in part on a direction of sight.

13. The pocket avatar apparatus of claim 12, wherein the number of horizontal sampling planes comprises N sampling planes; wherein the avatar animation engine is to employ n1 number of sampling planes for blending for a first area of the furry avatar directly in the direction of sight, n2 number of sampling planes for blending for a second area of the furry avatar immediately adjacent to the first area, wherein N, n1, and n2 are integers, with N greater than n2, and n2 greater than n1.

14. The pocket avatar apparatus of claim 12, wherein the avatar animation engine is to employ zero number of sampling planes for a back area of the furry avatar not visible in the direction of sight.

15. The pocket avatar apparatus of claim 13, wherein the avatar animation engine is to employ n3 number of sampling planes for blending for a third area of the furry avatar immediately adjacent to the second area, and one area removed from the first area, wherein n3 is an integer greater than n2.

16. A method for generating fur shell texture data for a furry avatar, comprising:
sampling, by a fur shell texture data map generator of a computing device, fur strands of the furry avatar across a plurality of horizontal planes under a predetermined number of conditions;
generating, by the fur shell texture data map generator, one or more fur shell texture data maps to depict color(s), length(s) or bending direction(s) of the fur strands under the predetermined number of conditions; and
providing, by the fur shell texture data map generator, the one or more fur shell texture data maps to an avatar animation engine of a mobile computing device for use to drive an avatar model to animate a furry avatar.

17. The method of claim 16, wherein generating comprises generating the one or more fur shell texture data maps in a form of one or more two dimensional, 2D, UV maps that include a fur color UV map, a fur length UV map, or a fur bending direction UV map.

18. The method of claim 16, wherein generating a fur color UV map comprises generating a red, green and blue (RGB) map that defines fur color of a furry area of the furry avatar and texture color of a mesh of an avatar model of the furry avatar.

19. The method of claim 16, wherein generating a fur length UV map comprises generating a gray color map that defines fur strand lengths of the furry avatar, with darker color depicting shorter fur strand length, and lighter color depicting longer fur strand length.

20. The method of claim 16, wherein generating a fur bending direction UV map comprises generating a RGB and Alpha (RGBA) map that defines bending force on the fur strands, with each pixel in the map having 4-channel color value, in which the RGB-channel represents a vector direction (x, y, and z) of the bending force, and the A-channel represents a magnitude of the bending force.

21. The method of claim 17, wherein generating the one or more 2D UV maps comprises generating one or more UV maps that are uniform in dimension and layout.

22. One or more non-transitory computer-readable media having a plurality of instructions that, in response to execution of the instructions by a computing device, cause an avatar animation engine of the computing device to drive an avatar model to animate a furry avatar, wherein to drive includes:
usage of a plurality of provided fur shell texture data maps that are pre-generated by a fur shell texture data map generator, through sampling of fur strands across a plurality of horizontal planes under a predetermined number of conditions;
determine an area of the furry avatar influenced by a force, and deformation of fur strands within the area caused by the force, under the redetermined number of conditions; and
adapt the animation, using the provided pre-generated fur shell texture data maps, to reflect the deformation of the fur strands within the influenced area, based at least in part on a plurality of parameters depicting the force.

23. The computer-readable media of claim 22, wherein the avatar animation engine is to facilitate a user in specifying the force; and wherein the plurality of parameters depicting the force includes a location of a source of the force, a direction of the force, or a strength of the force.

24. The computer-readable media of claim 22, wherein the avatar animation engine, as part of the determination of deformation of the fur strands within the influenced area, determines various offsets of the fur strands at the various horizontal sampling planes.

25. The computer-readable media of claim 24, wherein the avatar animation engine, as part of the determination of offsets of the fur strands at the various horizontal sampling planes, is to model a fur strand with a segment model of constant segment lengths; and wherein the avatar animation engine, as part of the adaptation of the animation, is to determine fur deformation on the avatar model, using the various offsets determined for the fur strands.

* * * * *

UNITED STATES PATENT AND TRADEMARK OFFICE
CERTIFICATE OF CORRECTION

PATENT NO. : 9,691,172 B2  
APPLICATION NO. : 14/763773  
DATED : June 27, 2017  
INVENTOR(S) : Shaohui Jiao et al.

Page 1 of 1

It is certified that error appears in the above-identified patent and that said Letters Patent is hereby corrected as shown below:

Claim 2, Column 22:
Line 17 reads "plurality fur," should read --plurality of fur--.

Claim 22, Column 24:
Line 28 reads "redetermined," should read --predetermined--.

Signed and Sealed this
Tenth Day of July, 2018

Andrei Iancu
*Director of the United States Patent and Trademark Office*